(12) United States Patent
Kou et al.

(10) Patent No.: US 11,833,603 B2
(45) Date of Patent: Dec. 5, 2023

(54) ELECTRICAL DISCHARGE MACHINING APPARATUS AND ELECTRICAL DISCHARGE MACHINING METHOD WITH ADJUSTABLE MACHINING PARAMETERS

(71) Applicant: HIGHLIGHT TECH CORP., Tainan (TW)

(72) Inventors: Chwung-Shan Kou, Tainan (TW); Wen-Yung Yeh, Tainan (TW)

( * ) Notice: Subject to any disclaimer, the term of this patent is extended or adjusted under 35 U.S.C. 154(b) by 0 days.

(21) Appl. No.: 17/742,441

(22) Filed: May 12, 2022

(65) Prior Publication Data
US 2022/0362872 A1    Nov. 17, 2022

Related U.S. Application Data

(60) Provisional application No. 63/252,652, filed on Oct. 6, 2021, provisional application No. 63/188,478, filed on May 14, 2021.

(30) Foreign Application Priority Data

May 5, 2022   (TW) ................................. 111117037

(51) Int. Cl.
  *B23H 7/20*     (2006.01)
  *B23H 7/30*     (2006.01)
  *B23H 7/16*     (2006.01)

(52) U.S. Cl.
  CPC ................ *B23H 7/20* (2013.01); *B23H 7/16* (2013.01); *B23H 7/30* (2013.01)

(58) Field of Classification Search
  CPC .. B23H 2600/10; B23H 2600/12; B23H 7/20; B23H 7/06; B23H 7/065; G05B 2219/45043
  See application file for complete search history.

(56) References Cited

U.S. PATENT DOCUMENTS 4,292,491 A * 9/1981 Tanaka .................. B23H 7/065
                                                    219/69.12

FOREIGN PATENT DOCUMENTS

| CN | 102137735 A | 7/2011 |
|----|-------------|--------|
| CN | 108621315 A | 10/2018 |
| CN | 108995063 A | 12/2018 |
| CN | 111267245 A | 6/2020 |

(Continued)

*Primary Examiner* — Geoffrey S Evans

(57) ABSTRACT

An electrical discharge machining apparatus and an electrical discharge machining method with adjustable machining parameters comprise a carrier and an electrical discharge machining (EDM) unit. The carrier is used for placing a to-be-machined object defined with a machining target area. A discharge electrode of the electrical discharge machining (EDM) unit is used to cut the machining target area of the to-be-machined object along a first cutting direction with at least one machining parameter, the machining parameter is correspondingly adjusted when a specified parameter of the to-be-machined object changes to a first numerical value, thereby using the adjusted machining parameter to perform a second cutting step on the machining target area of the to-be-machined object. A segmented cutting technology for solving a problem that a cutting speed ($mm^2/min$) is slowed down and a total cutting time is prolonged due to changes of the specified parameter of electrical discharge machining cutting.

29 Claims, 12 Drawing Sheets

(56) References Cited

FOREIGN PATENT DOCUMENTS

| | | | |
|---|---|---|---|
| CN | 112297261 A | 2/2021 | |
| EP | 3708286 A1 * | 9/2020 | ............... B23H 1/00 |
| JP | S51000099 | 1/1976 | |
| JP | S62241623 | 10/1987 | |
| JP | 2007276097 A | 10/2007 | |
| JP | 2010046792 A | 3/2010 | |
| JP | 2010173040 A | 8/2010 | |
| JP | 2015217438 | 12/2015 | |
| JP | 2016040058 | 3/2016 | |
| JP | 2016097497 | 5/2016 | |
| JP | 6141557 B1 | 6/2017 | |
| JP | 2019505711 | 2/2019 | |
| WO | WOA2013153691 | 10/2013 | |

* cited by examiner

ELECTRICAL DISCHARGE MACHINING APPARATUS AND ELECTRICAL DISCHARGE MACHINING METHOD WITH ADJUSTABLE MACHINING PARAMETERS

CROSS-REFERENCE TO RELATED APPLICATION

This application claims priority to U.S. Provisional Patent Application No. 63/188,478, filed on May 14, 2021; claims priority from U.S. Provisional Patent Application No. 63/252,652, filed on Oct. 6, 2021; and claims priority from Taiwan Patent Application No. 111117037, filed on May 5, 2022, each of which is hereby incorporated herein by reference in its entireties.

BACKGROUND OF THE INVENTION

1. Field of Invention

The invention relates to a machining apparatus and a machining method, and more particularly to an electrical discharge machining apparatus and an electrical discharge machining method with adjustable machining parameters.

2. Description of the Related Art

With the booming semiconductor industry, electrical discharge machining technology has been commonly used to process ingots or wafers. Electrical discharge machining (EDM) is a manufacturing process in which sparks are generated by electrical discharges whereby a desired shape of a to-be-machined object can be obtained. A dielectric material separates two electrodes and a voltage is applied to generate rapidly recurring current discharges between the two electrodes to machine the to-be-machined object. Electrical discharge machining technology uses two electrodes, one of which is called the tool electrode, or the discharge electrode, while the other is called the workpiece electrode, connected to the to-be-machined object. During electrical discharge machining, there is no physical contact between the discharge electrode and the workpiece electrode.

When the potential difference between the two electrodes is increased, the electric field between the two electrodes becomes greater until the intensity of the electric field exceeds the dielectrical strength, causing dielectric breakdown, current flows through the two electrodes, and part of the material is removed. Once the current stops, new dielectric material is conveyed into the inter-electrode electric field, enabling the partial material to be carried away and restoring the dielectric insulating effect. After a current flow, the potential difference between the two electrodes is restored to what it was before the dielectric breakdown, so that a new dielectric breakdown can occur to repeat the cycle. However, the conventional electrical discharge machining technology has a problem that the cutting speed (i.e., the product of the feeding speed of the discharge electrode on the workpiece and the cutting thickness during machining; mm$^2$/min) is slow due to the large cutting thickness.

SUMMARY OF THE INVENTION

In view of the above problem, one object of the invention is to provide an electrical discharge machining apparatus and an electrical discharge machining method with adjustable machining parameters capable of solving the above-mentioned problem of the prior art.

In order to achieve the aforementioned object, the invention provides an electrical discharge machining apparatus with adjustable machining parameters for performing a cutting procedure, comprising: a carrier for placing at least one to-be-machined object, the to-be-machined object is defined with a machining target area; and an electrical discharge machining (EDM) unit for cutting the machining target area of the to-be-machined object along a first cutting direction by at least one discharge electrode of the electrical discharge machining (EDM) unit with at least one machining parameter in a first cutting step of the cutting procedure, wherein the machining parameter is correspondingly adjusted when a specified parameter of the to-be-machined object changes to a first numerical value, thereby using the adjusted machining parameter to perform a second cutting step on the machining target area of the to-be-machined object.

Preferably, the machining parameter comprises one or more than one of an orientation parameter, a discharge electrical parameter, a deslagging parameter, and a movement and tension parameter.

Preferably, the orientation parameter is a machining direction relative to the to-be-machined object; the discharge electrical parameter comprises one or more than one of a peak current, a voltage when the to-be-machined object is away from the discharge electrode, a duration of discharge pulse, a rest time of discharge pulse, and a servo reference voltage between the discharge electrode and the to-be-machined object; the deslagging parameter comprises a flow rate of a deslagging liquid provided on the discharge electrode; the movement and tension parameter comprises one or more than one of a movement speed of the discharge electrode and a tension of the discharge electrode.

Preferably, the specified parameter comprises a first to-be-cut thickness of the to-be-machined object, the machining parameter is correspondingly adjusted when the first to-be-cut thickness of the to-be-machined object increases to the first numerical value, thereby using the adjusted machining parameter to perform the second cutting step on the machining target area of the to-be-machined object.

Preferably, the machining parameter is an orientation parameter, when the first to-be-cut thickness of the to-be-machined object increases to the first numerical value, the electrical discharge machining (EDM) unit changes the orientation parameter from the first cutting direction to a second cutting direction, thereby performing the second cutting step on the machining target area of the to-be-machined object along the second cutting direction.

Preferably, a first included angle is between the second cutting direction and the first cutting direction, and the first included angle ranges from 0 degree to 360 degrees.

Preferably, the first included angle is 180 degrees.

Preferably, a second to-be-cut thickness of the to-be-machined object in the second cutting step is smaller than the first numerical value.

Preferably, a cutting speed of the discharge electrode on the to-be-machined object in the second cutting step is greater than a cutting speed of the discharge electrode on the to-be-machined object when the first to-be-cut thickness is the first numerical value.

Preferably, when a second to-be-cut thickness of the to-be-machined object increases to a second numerical value in the second cutting step, the electrical discharge machining (EDM) unit changes the orientation parameter from the second cutting direction to a third cutting direction, thereby performing a third cutting step on the machining target area of the to-be-machined object along the third cutting direction, wherein the to-be-machined object has a third to-be-cut thickness in the third cutting step.

Preferably, a second included angle is between the third cutting direction and the second cutting direction, and the second included angle is between 0 degree and 360 degree.

Preferably, the second included angle is 90 degrees.

Preferably, the third to-be-cut thickness of the to-be-machined object in the third cutting step is smaller than the first numerical value or the second numerical value.

Preferably, a cutting speed of the discharge electrode on the to-be-machined object in the third cutting step is greater than a cutting speed of the discharge electrode on the to-be-machined object when the first to-be-cut thickness is the first numerical value or a cutting speed of the discharge electrode on the to-be-machined object when the second to-be-cut thickness is the second numerical value.

Preferably, further comprising a heat source, and the heat source heating the to-be-machined object during the cutting procedure.

Preferably, the discharge electrode cuts the machining target area of the to-be-machined object in a fluid.

Preferably, the machining target area is provided with a filling material thereon for filling surface cracks formed on the machining target area during the cutting procedure.

Preferably, the filling material is formed on the machining target area by a heat source for filling surface cracks formed on the machining target area during the cutting procedure.

Preferably, further comprising an external disturbance source, the external disturbance source causing a filling material to fill surface cracks on the machining target area during the cutting procedure.

Preferably, a quantity of the to-be-machined object is one or more than one.

Preferably, a quantity of the discharge electrode is one or more than one

Preferably, the discharge electrode cuts the machining target area of the to-be-machined object in a vacuum environment.

In order to achieve the aforementioned object, the invention provides an electrical discharge machining method with adjustable machining parameters, using the electrical discharge machining apparatus with the adjustable machining parameters for performing a cutting procedure.

In order to achieve the aforementioned object, the invention provides an electrical discharge machining method with adjustable machining parameters for performing a cutting procedure, comprising following steps of: providing at least one to-be-machined object, the to-be-machined object being placed on a carrier, the to-be-machined object being defined with a machining target area; performing a first cutting step by applying a discharge energy to the machining target area of the to-be-machined object along a first cutting direction through at least one discharge electrode with at least one machining parameter for cutting the machining target area of the to-be-machined object; performing a first adjustment step by correspondingly adjusting the machining parameter when a first to-be-cut thickness of the to-be-machined object increasing to a first numerical value; and performing a second cutting step by applying the discharge energy to the machining target area of the to-be-machined object through the discharge electrode with the machining parameter adjusted by the first adjustment step for cutting the machining target area of the to-be-machined object.

Preferably, the machining parameter is an orientation parameter, and in the first cutting step, when the first to-be-cut thickness of the to-be-machined object increasing to the first numerical value, performing the first adjustment step for changing the orientation parameter from the first cutting direction to a second cutting direction, and performing the second cutting step on the machining target area of the to-be-machined object along the second cutting direction.

Preferably, a second to-be-cut thickness of the to-be-machined object in the second cutting step is smaller than the first numerical value.

Preferably, in the second cutting step, when a second to-be-cut thickness of the to-be-machined object cut by the discharge electrode increasing to a second numerical value, performing a second adjustment step for changing the orientation parameter from the second cutting direction to a third cutting direction, and performing a third cutting step on the machining target area of the to-be-machined object along the third cutting direction.

Preferably, a third to-be-cut thickness of the to-be-machined object in the third cutting step is smaller than the first numerical value or the second numerical value.

Preferably, in the first adjustment step, changing a placement direction of the to-be-machined object for adjusting the machining parameter.

Preferably, in the first adjustment step, changing a feeding direction of the discharge electrode relative to the to-be-machined object for adjusting the machining parameter.

Preferably, in the first adjustment step, using the carrier to change a placement direction of the to-be-machined object for adjusting the machining parameter.

Preferably, further comprising a filling step for filling surface cracks formed on the machining target area during the cutting procedure.

In summary, the electrical discharge machining apparatus and the electrical discharge machining method with adjustable machining parameters of the invention have the following advantages:

(1) The segmented cutting technology is capable of solving the problem of long total cutting time caused by large cutting thickness of electrical discharge machining.

(2) With the segmented cutting technology, when the to-be-cut parameters change to the set numerical value, the feeding direction can be changed immediately.

(3) With the segmented cutting technology, when the to-be-cut thickness is greater than the set numerical value, the feeding direction is changed immediately to be capable of dividing the to-be-cut surface with a large thickness into several cut surfaces with a smaller thickness, thereby solving the problem of slow cutting speed caused by large cutting thickness of electrical discharge machining.

In order to enable the examiner to have a further understanding and recognition of the technical features of the invention and the technical efficacies that can be achieved, preferred embodiments in conjunction with detailed explanation are provided as follows.

DETAILED DESCRIPTION OF THE INVENTION

Figure 1:
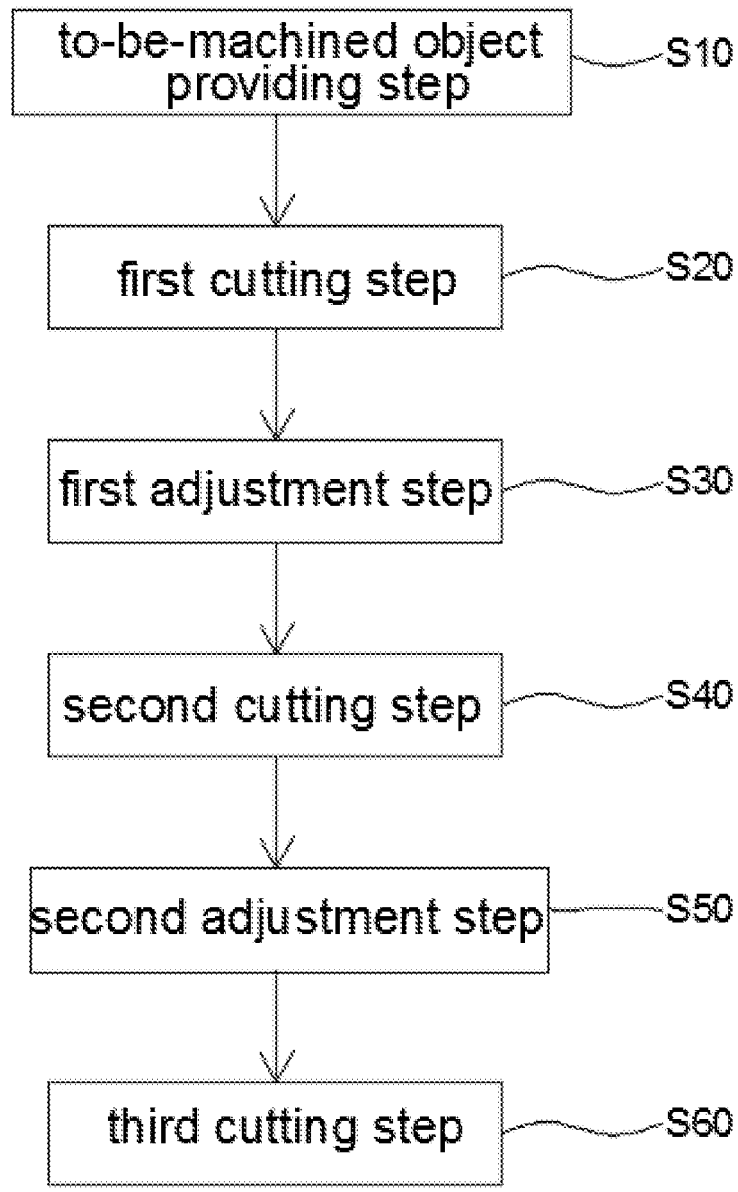
FIG. 1 is a flow chart of steps of an electrical discharge machining method with adjustable machining parameters of the invention.

In order to understand the technical features, content and advantages of the invention and its achievable efficacies, the invention is described below in detail in conjunction with the figures, and in the form of embodiments, the figures used herein are only for a purpose of schematically supplementing the specification, and may not be true proportions and precise configurations after implementation of the invention; and therefore, relationship between the proportions and configurations of the attached figures should not be interpreted to limit the scope of the claims of the invention in actual implementation. In addition, in order to facilitate understanding, the same elements in the following embodiments are indicated by the same referenced numbers. And the size and proportions of the components shown in the drawings are for the purpose of explaining the components and their structures only and are not intending to be limiting.

Unless otherwise noted, all terms used in the whole descriptions and claims shall have their common meaning in the related field in the descriptions disclosed herein and in other special descriptions. Some terms used to describe in the present invention will be defined below or in other parts of the descriptions as an extra guidance for those skilled in the art to understand the descriptions of the present invention.

The terms such as "first", "second", "third" used in the descriptions are not indicating an order or sequence, and are not intending to limit the scope of the present invention. They are used only for differentiation of components or operations described by the same terms.

Moreover, the terms "comprising", "including", "having", and "with" used in the descriptions are all open terms and have the meaning of "comprising but not limited to".

The invention discloses a segmented cutting technology, preferably, when a specified parameter changes to a correspondingly set numerical value (first numerical value, second numerical value, third numerical value, and so on), machining parameters are adjusted in order to solve a problem that changes of the specified parameter in an electrical discharge machining procedure causing a cutting speed to be slow and a total cutting time to be long. Wherein, the specified parameter is, for example, a to-be-cut thickness or a cutting speed of a to-be-machined object. Taking the specified parameter as the to-be-cut thickness of the to-be-machined object as an example, in a first cutting step of an electrical discharge machining procedure, when a first to-be-cut thickness of the to-be-machined object increases to the correspondingly set numerical value such as a first numerical value, the machining parameters are adjusted, and a subsequent second cutting step is performed with the adjusted machining parameters, and so on. Taking the specified parameter as the cutting speed of the to-be-machined object as an example, in the first cutting step of the electrical discharge machining procedure, when a first cutting speed of the to-be-machined object is reduced to the correspondingly set numerical value (such as the first numerical value), the machining parameters are adjusted, and the subsequent second cutting step is performed with the adjusted machining parameters, and so on.

Figure 2:
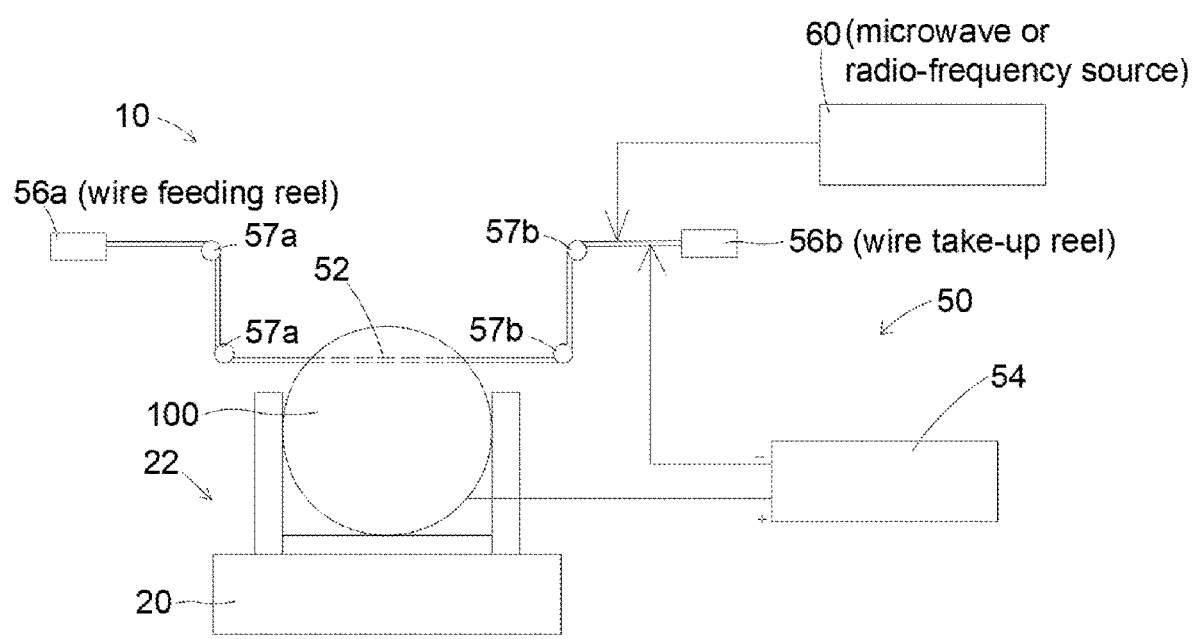
FIG. 2 is a schematic diagram of a first embodiment of an electrical discharge machining apparatus with adjustable machining parameters of the invention.

Please refer to FIG. 1 and FIG. 2 respectively for a flow chart of steps of an electrical discharge machining method with adjustable machining parameters of the invention; and a schematic diagram of a first embodiment of an electrical discharge machining apparatus with adjustable machining parameters of the invention. The invention discloses a segmented cutting technology, in which when a specified parameter changes to a correspondingly set numerical value, machining parameters are adjusted in order to solve a problem that a large cutting thickness in electrical discharge machining causing a cutting speed to be slow and a total cutting time to be long.

In the first embodiment of the invention, an electrical discharge machining apparatus 10 of the invention comprises a carrier 20 and an electrical discharge machining (EDM) unit 50 for performing an electrical discharge machining procedure, such as a cutting procedure, on a to-be-machined object 100 to achieve cutting, slicing or thinning effect. For example, the carrier 20 is provided with a jig 22, and the carrier 20 can be a movable carrier or a fixed carrier.

Firstly, the electrical discharge machining method of the invention providing the to-be-machined object 100 (step S10), and using the jig 22 to place the to-be-machined object 100 on the carrier 20, wherein the to-be-machined object 100 is defined with a machining target area 110, and the machining target area 110 can be located on any position of the to-be-machined object 100 suitable for machining. The to-be-machined object 100 can be any conductor or semiconductor structure, such as a wafer or an ingot, but a cross-section of the to-be-machined object 100 is not limited to a circle, it can be any shape.

The electrical discharge machining (EDM) unit 50 of the electrical discharge machining apparatus 10 of the invention at least has a discharge electrode 52, the discharge electrode 52 is, for example, a wire-shaped conductive wire, a plate-shaped conductive plate, or a conductive structure of other shapes. The electrical discharge machining (EDM) unit 50 of the invention can further optionally have a wire feeding reel 56a and a wire take-up reel 56b, wherein two ends of the discharge electrode 52 are respectively connected to the wire feeding reel 56a and the wire take-up reel 56b, the wire feeding reel 56a and the wire take-up reel 56b can optionally respectively use pulleys 57a, 57b to sleeve with the discharge electrode 52, thereby positioning the discharge electrode 52, and for example, adjusting a tension of the discharge electrode 52.

Please continue to refer to FIG. 2, the electrical discharge machining (EDM) unit 50 of the invention further has a power source 54, the power source 54 is connected to the discharge electrode 52 by an electrical circuit, so as to generate a voltage difference between the discharge electrode 52 and the to-be-machined object 100, and a discharge energy will be provided to the machining target area 110 of the to-be-machined object 100, thereby the to-be-machined object 100 can be cut along the machining target area 110 (step S20).

The invention can also optionally comprise a microwave or radio-frequency source 60 for providing a microwave energy or a radio-frequency energy to the machining target area 110 of the to-be-machined object 100 so as to provide heating effect, annealing effect, grinding effect, or polishing effect to be capable of effectively reducing surface roughness and avoiding a need for performing subsequent mechanical or chemical grinding step or polishing step. Likewise, the microwave or radio-frequency source 60 of the invention is also capable of providing the microwave energy or radio-frequency energy to the machining target area 110 of the to-be-machined object 100 through the discharge electrode 52. Taking the microwave or radio-frequency source 60 as a microwave source as an example, a wavelength of a microwave of the invention is in a range of about 1 mm to about 1 m, a frequency range is about 300 GHz to about 0.3 GHz, and a power range is about 200 watts to about 5,000 watts. A material of the discharge electrode 52 can be selected from, for example, a group consisting of copper, brass, molybdenum, tungsten, graphite, steel, aluminum and zinc. A thickness of the discharge electrode 52 is less than about 300 µm, and a thickness of the discharge electrode 52 is preferably in a range of about 30 µm to about 300 µm.

Figure 4A:
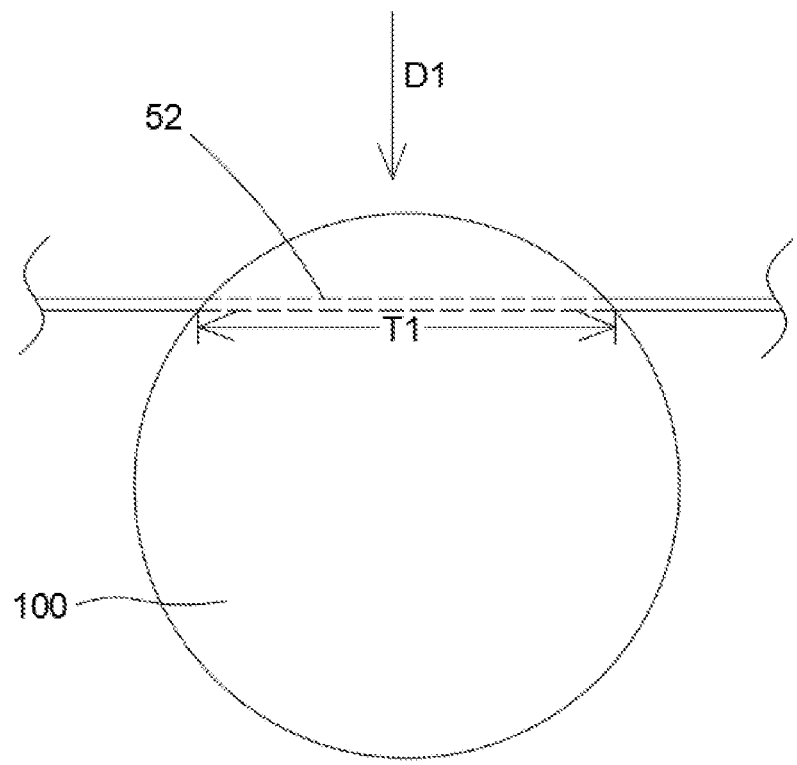
FIGS. 4a and 4b are respectively a front view and a cross-sectional side view of a to-be-machined object when performing a first cutting step in the invention.

In detail, as shown in FIG. 2 and FIG. 4*a*, in step S20, the discharge electrode 52 applying the discharge energy to the machining target area 110 of the to-be-machined object 100 along a first cutting direction D1 with at least one machining parameter for cutting the machining target area 110 of the to-be-machined object 100. Taking the to-be-machined object 100 as a cylindrical ingot as an example, the machining target area 110 is defined in a radial direction of the ingot, for example, as shown by dotted lines in FIG. 4*b* and FIG. 5*b*, wherein the dotted line represents the machining target area 110 that has not been cut, and a solid line represents the machining target area 110 that has been cut. A to-be-cut thickness of the ingot is not a fixed value, but will change, for example, for parallel cutting by the discharge electrode 52 from top to bottom, the to-be-cut thickness at a top of the ingot is a minimum value, and a maximum value of the to-be-cut thickness of the ingot is its diameter length. Moreover, generally when the to-be-cut thickness of the ingot exceeds a certain numerical value, a cutting speed of the ingot will decrease nonlinearly with increase of the to-be-cut thickness. Therefore, the to-be-cut thickness is taken as an example for the specified parameter in the segmented cutting technology disclosed in the invention, that is, the machining parameters are adjusted correspondingly according to the to-be-cut thickness of the to-be-machined object 100. For example, when an overlapping length of the discharge electrode 52 and the to-be-machined object 100 (that is, the to-be-cut thickness of the to-be-machined object 100) reaches a set numerical value, the machining parameters can be changed, for example, a feeding direction relative to the to-be-machined object 100 can be changed; therefore, the subsequent to-be-cut thickness of the to-be-machined object 100 can be made smaller than the set numerical value, so that an efficacy of optimizing a total cutting time of the entire to-be-machined object 100 can be achieved. For example, the invention is capable of adjusting the machining parameters correspondingly (step S30) according to a first to-be-cut thickness T1 of the to-be-machined object 100 in a first cutting step S20, that is, determining whether the first to-be-cut thickness T1 of the to-be-machined object 100 in the first cutting step S20 has reached the set numerical value (the first numerical value), if "yes", adjusting the machining parameters, and then performing a second cutting step S40 on the machining target area 110 of the to-be-machined object 100 using the adjusted machining parameter.

Taking the machining parameter as an orientation parameter (i.e., a machining direction relative to the to-be-machined object 100) as an example, in the first cutting step S20, the discharge electrode 52 applying the discharge energy to the machining target area 110 of the to-be-machined object 100 with at least one machining parameter for cutting the to-be-machined object 100 along the first cutting direction D1. However, when the first to-be-cut thickness T1 of the to-be-machined object 100 increases to the set numerical value (the first numerical value), the invention performing a first adjustment step S30 for changing the orientation parameter from the first cutting direction D1 to a second cutting direction D2. Then, performing the second cutting step S40. Wherein, a first included angle is between the second cutting direction D2 and the first cutting direction D1, for example, 180 degrees. However, the invention is not limited thereto, and a range of the first included angle is, for example, between 0 degree and 360 degrees.

Likewise, in the second cutting step S40, the discharge electrode 52 cutting the to-be-machined object 100 in the second cutting direction D2. In the second cutting step S40, when a second to-be-cut thickness T2 of the to-be-machined object 100 cut by the discharge electrode 52 increasing to the second numerical value, the electrical discharge machining (EDM) unit 50 adjusting the orientation parameter again (step S50) for changing the orientation parameter from the second cutting direction D2 to a third cutting direction D3, and then performing a third cutting step S60 on the machining target area 110 of the to-be-machined object 100 along the third cutting direction D3, wherein in the third cutting step S60, a third to-be-cut thickness T3 of the to-be-machined object 100 in the third cutting direction D3 has a third numerical value. The second numerical value is, for example, less than, greater than or equal to the first numerical value. The third numerical value is, for example, less than, greater than or equal to the first numerical value or the second numerical value. In one embodied mode of the invention, the second numerical value is equal to the first numerical value, and the third numerical value is smaller than the first numerical value (the second numerical value). Wherein, a second included angle is between the third cutting direction D3 and the second cutting direction D2, and the second included angle is between 0 degree and 360 degrees, for example, 90 degrees. However, the invention is not limited thereto, a range of the second included angle is, for example, between 0 degree and 360 degrees. However, in another embodied mode of the invention, taking dual-segmented cutting as an example, if the second numerical value is equal to the first numerical value, and the to-be-machined object 100 cut by the discharge electrode 52 is performed in the second cutting step S40, when the second to-be-cut thickness T2 has not increased to the second numerical value (the first numerical value), the invention is capable of cutting the to-be-machined object 100 in the second cutting direction D2 until cutting is completed. In the dual-segmented cutting, since the second to-be-cut thickness T2 of the invention is smaller than a diameter of the ingot, a speed of cutting the to-be-machined object 100 of the invention can still be faster than the conventional unsegmented cutting technology, and a required total cutting time in the dual-segmented cutting is shorter.

Taking the to-be-machined object 100 as an ingot as an example, one of the features of the invention is that all the numerical values of the specified parameter (such as the first to-be-cut thickness T1, the second to-be-cut thickness T2 and the third to-be-cut thickness T3) are smaller than a diameter of the ingot; therefore, the problem of slow cutting speed caused by large cutting thickness in the conventional electrical discharge machining technology can be solved by the invention. Moreover, taking the above-mentioned tri-segmented cutting as an example, the third numerical value of the third to-be-cut thickness T3 of the invention is smaller than the first numerical value of the first to-be-cut thickness T1 (that is, the second numerical value of the second to-be-cut thickness T2), of course, is also smaller than the diameter of the ingot. Therefore, if the ingot is completely cut along the third cutting direction D3 (from the left to the right), a speed of cutting the to-be-machined object 100 of the invention can be faster than the conventional unsegmented cutting technology, and a required total cutting time in the tri-segmented cutting is shorter.

Wherein the set numerical value mentioned above can be obtained by calculation, for example, a user can measure a size of the to-be-machined object 100 to obtain numerical values that meet a condition that the first numerical value of the first to-be-cut thickness T1 being greater than the third numerical value of the third to-be-cut thickness T3, and the numerical values are manually input into the electrical discharge machining (EDM) unit 50 for the electrical discharge machining (EDM) unit 50 to adjust the machining parameters for different to-be-cut thicknesses, wherein a best solution for setting of the set numerical value can be found according to a relationship between the to-be-cut thickness and the cutting speed. Alternatively, the numerical values of the first to-be-cut thickness T1, the second to-be-cut thickness T2, and the third to-be-cut thickness T3 can also be obtained by, for example, a machine learning algorithm, for example, a database can be established based on multiple actual machining data to provide the machine learning algorithm with optimized machining parameters to automatically adjust the machining parameters for different to-be-cut thicknesses. Alternatively, in the invention, a numerical relationship between the first to-be-cut thickness T1, the second to-be-cut thickness T2, and the third to-be-cut thickness T3 does not need to be considered, and the user, for example, directly specifies the first numerical value of the first to-be-cut thickness T1 and/or the second numerical value of the second to-be-cut thickness T2, wherein the first numerical value and/or the second numerical value can be any numerical value greater than 0 and less than a diameter of the ingot. If a radial section of the to-be-machined object 100 is a perfect circle as an example, the set numerical value (the first numerical value) can be, for example, between a length of a side of a square inside the circle and a diameter of the circle. However, in other embodied modes, the set numerical value (the first numerical value) can also be, for example, less than or equal to the side length of the square inside the circle. That is, as long as the second to-be-cut thickness T2 or the third to-be-cut thickness T3 is smaller than the diameter of the ingot, it is conducive to improving an overall cutting speed. For example, in other embodied modes, as long as the discharge electrode 52 is capable of partially cutting the machining target area 110 of the to-be-machined object 100 along the first cutting direction D1 in the first cutting step S20, then the invention is capable of, for example, changing a machining direction relative to the to-be-machined object 100 from the first cutting direction D1 to the second cutting direction D2, and performing the second cutting step S40 along the second cutting direction D2. Likewise, as long as the discharge electrode 52 is capable of partially cutting the machining target area 110 of the to-be-machined object 100 along the second cutting direction D2 in the second cutting step S40, then the invention is capable of, for example, changing a machining direction relative to the to-be-machined object 100 from the second cutting direction D2 to the third cutting direction D3, and performing the third cutting step S60 along the third cutting direction D3, and so on. Furthermore, although the segmented cutting technology of the invention is exemplified by the tri-segmented cutting, the invention is not limited to the tri-segmented cutting, and the invention is also capable of performing the dual-segmented cutting, quadri-segmented cutting or even multi-segmented cutting, as long as an overall cutting speed is faster than the conventional unsegmented cutting technology, any number of segmented cutting can be applied to the invention.

Taking the machining parameter as the orientation parameter (i.e., a machining direction relative to the to-be-machined object 100) as an example, the invention is capable of achieving an effect of changing a feeding direction by adjusting a placement direction of the to-be-machined object 100, for example. Taking automatically changing the placement direction of the to-be-machined object 100 as an example, as shown in FIG. 2, the carrier 20 of the invention can be, for example, a movable carrier with a multi-axes (e.g., 2-axes, 3-axes or more) motor, by changing a machining direction of the jig 22 relative to the discharge electrode 52, the discharge electrode 52 is capable of cutting the to-be-machined object 100 in the first cutting direction D1, the second cutting direction D2, the third cutting direction D3 or other directions. Alternatively, as shown in FIG. 2, the electrical discharge machining (EDM) unit 50 of the invention, such as the wire feeding reel 56a and the wire take-up reel 56b thereof, for example, can have a multi-axes (e.g., 2-axes, 3-axes or more) motor, by adjusting a feeding direction of the electrical discharge machining (EDM) unit 50, a machining direction of the discharge electrode 52 relative to the to-be-machined object 100 can be changed, thereby the discharge electrode 52 is capable of cutting the to-be-machined object 100 in the first cutting direction D1, the second cutting direction D2, the third cutting direction D3 or other directions. Taking manually changing the placement direction of the to-be-machined object 100 as an example, the user, for example, can manually change the placement direction of the to-be-machined object 100 on the carrier 20, thereby the discharge electrode 52 is capable of cutting the to-be-machined object 100 in the first cutting direction D1, the second cutting direction D2, the third cutting direction D3 or other directions.

In addition, although the machining parameter of the invention is exemplified by the orientation parameter, it is not intended to limit the invention. Wherein the machining parameter can also be, for example, one or more than one of an orientation parameter, a discharge electrical parameter, a deslagging parameter, and a movement and tension parameter. In detail, the orientation parameter is, for example, a machining direction relative to the to-be-machined object 100; the discharge electrical parameter comprises one or more than one of a peak current (maximum current passing between two poles of the discharge electrode 52 during electrical discharging), a voltage when the to-be-machined object is away from the discharge electrode, a duration of discharge pulse, a rest time of discharge pulse, and a servo reference voltage between the discharge electrode 52 and the to-be-machined object 100; the deslagging parameter comprises a flow rate of a deslagging liquid provided on the discharge electrode 52, the deslagging liquid is, for example, water, preferably deionized water, and the deslagging liquid is, for example, provided between two endpoints of the discharge electrode 52; the movement and tension parameter comprises one or more than one of a movement speed of the discharge electrode 52 and a tension of the discharge electrode 52. Wherein a range of an inter-electrode voltage (voltage between the discharge electrode 52 and a workpiece electrode) is about 0 to about 300 V, a range of the discharge pulse duration is about 5 µs to about 2400 µs, and a range of the discharge pulse rest time is about 5 µs to about 2400 µs. In other words, the machining parameters of the invention can comprise, for example, various electrical discharge machining parameters, and are not limited to adjusting one type of the machining parameters or more than one type of the machining parameters. Moreover, the invention is preferably capable of adjusting the above-mentioned machining parameters according to different to-be-cut thicknesses.

Figure 3:
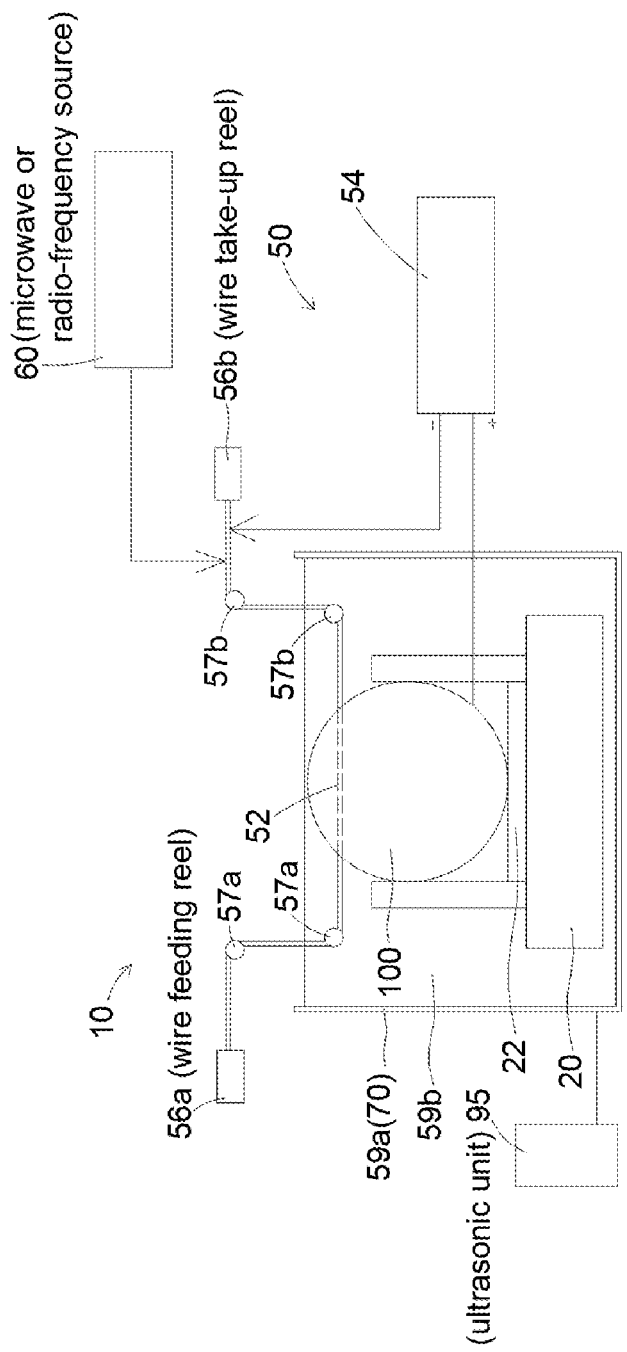
FIG. 3 is a schematic diagram of a second embodiment of the electrical discharge machining apparatus with the adjustable machining parameters of the invention.
Figure 4B:
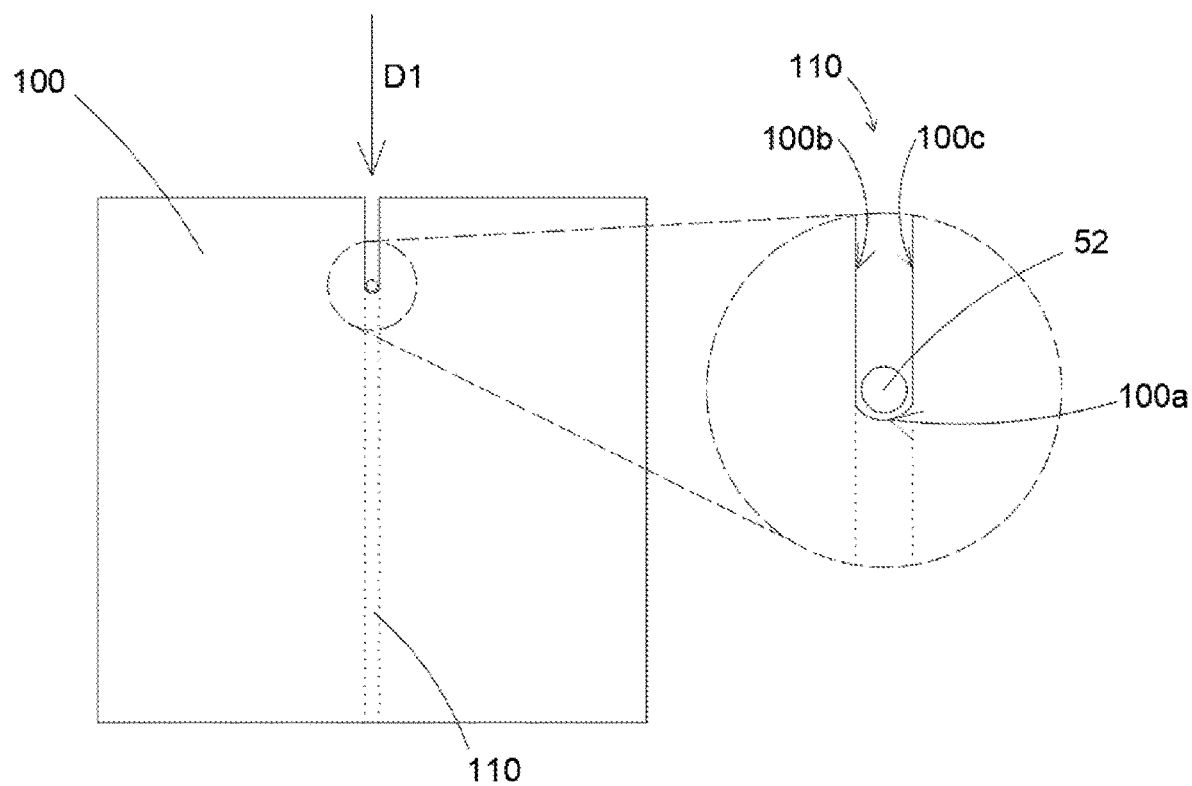
Figure 5A:
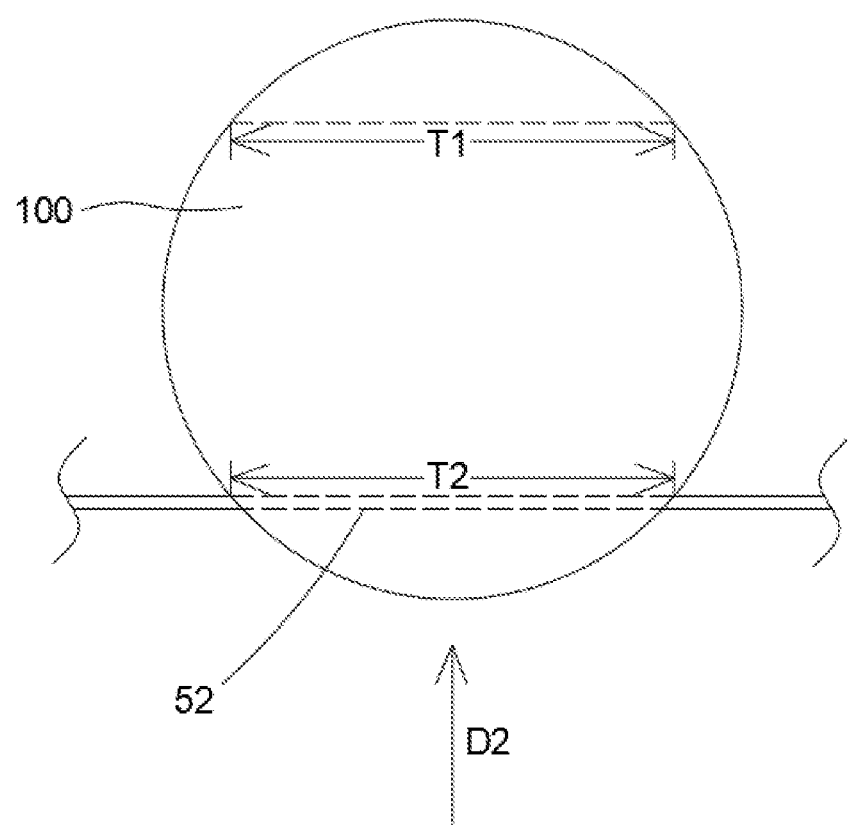
FIGS. 5a and 5b are respectively a front view and a cross-sectional side view of the to-be-machined object when performing a second cutting step in the invention.
Figure 5B:
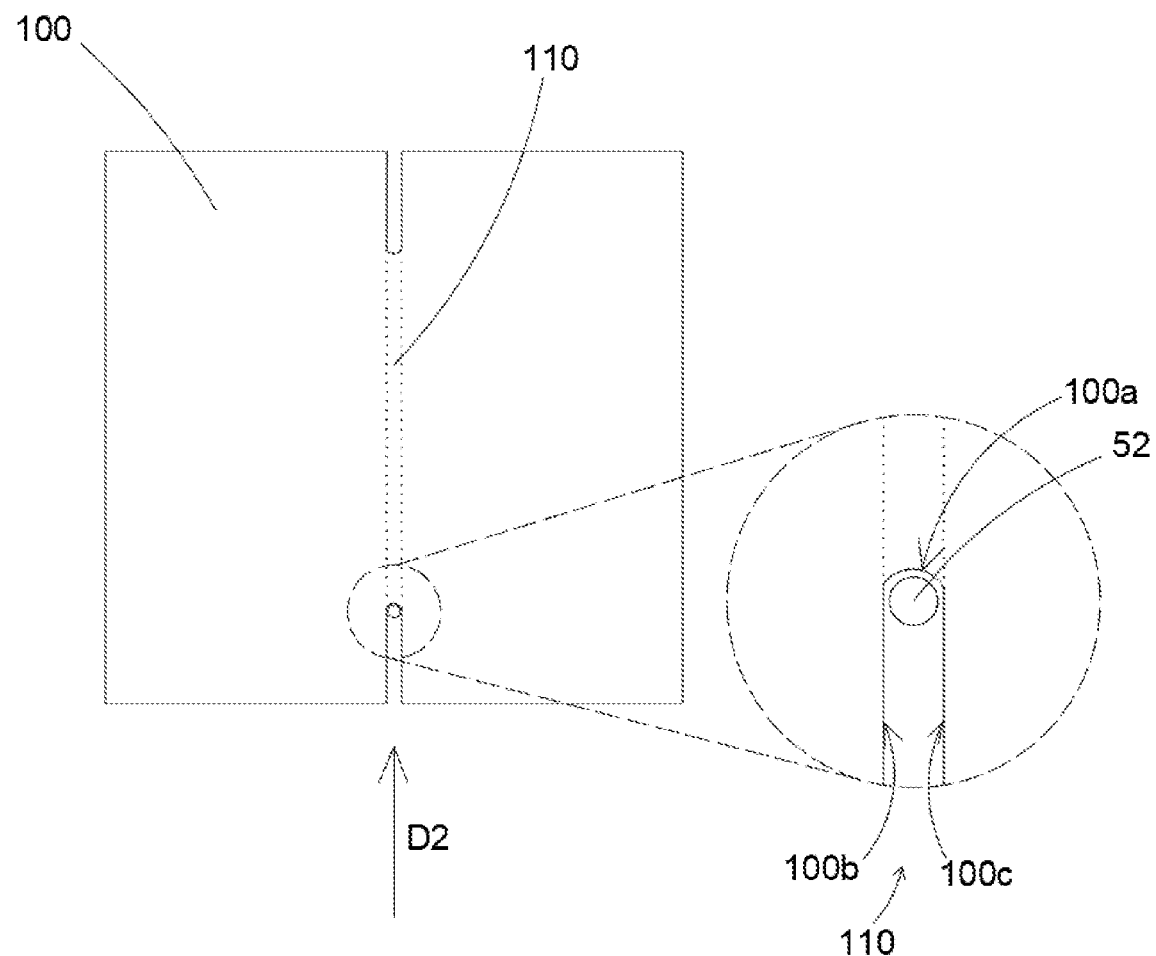
Figure 6A:
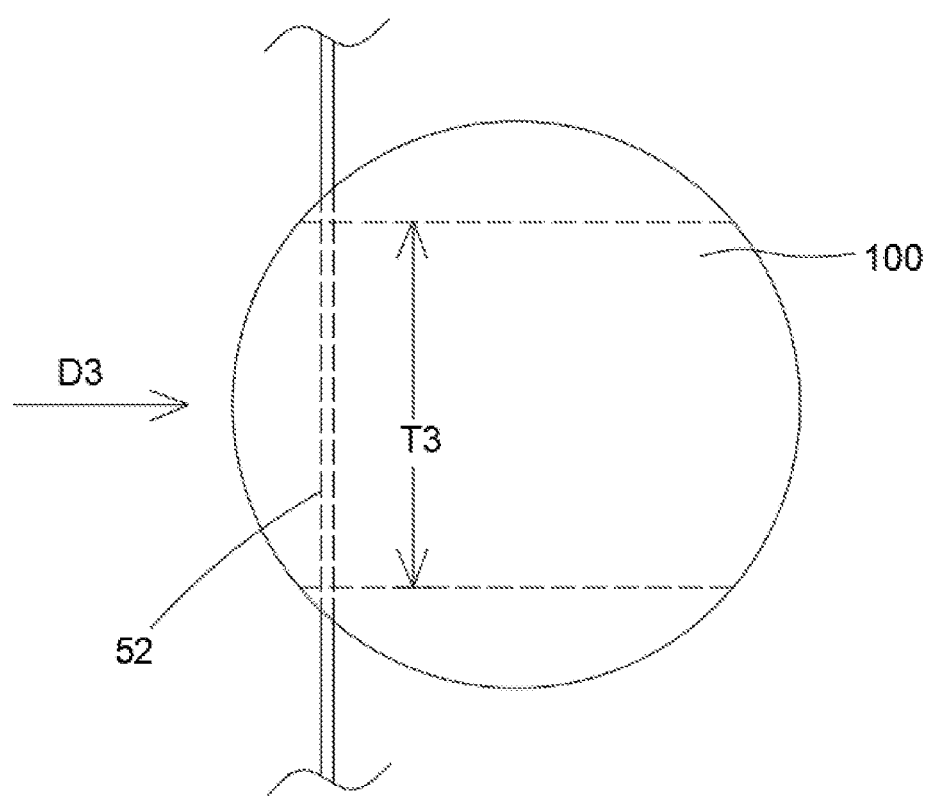
FIGS. 6a and 6b are respectively a front view and a cross-sectional side view of the to-be-machined object when performing a third cutting step in the invention.
Figure 6B:
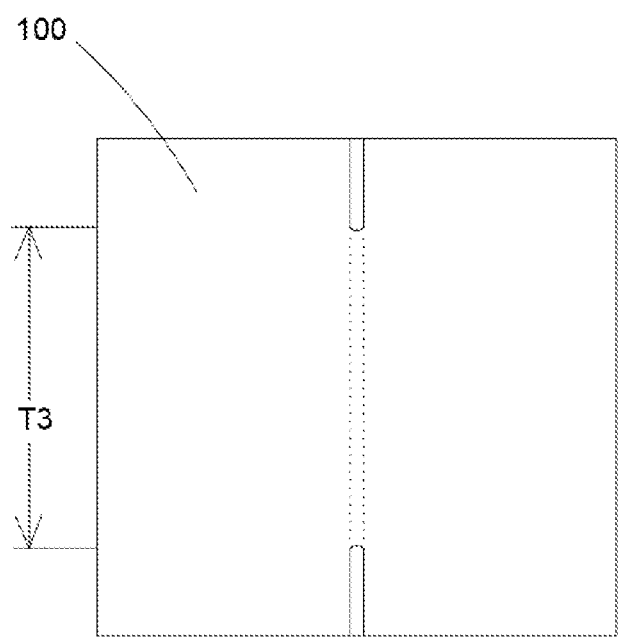
Figure 7A:
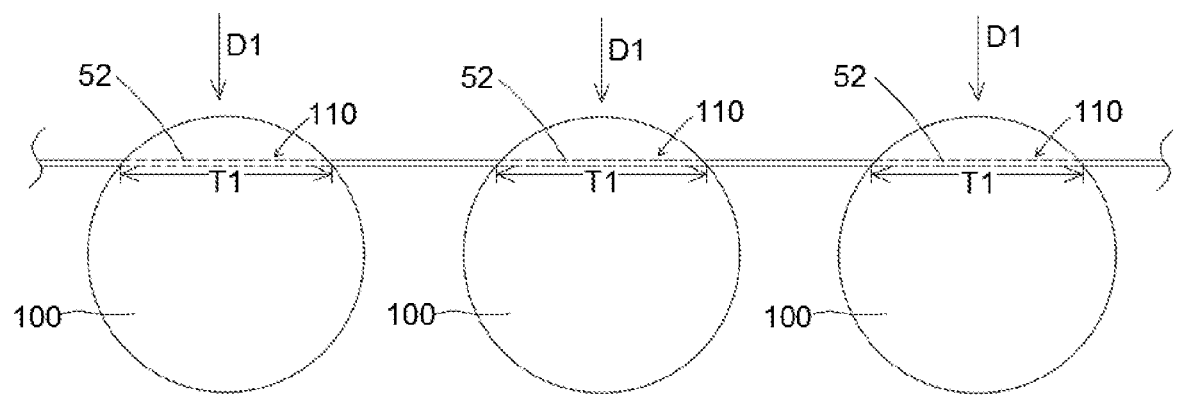
FIG. 7a is a schematic diagram of cutting a plurality of to-be-machined objects by using a single discharge electrode in the invention.
Figure 7B:
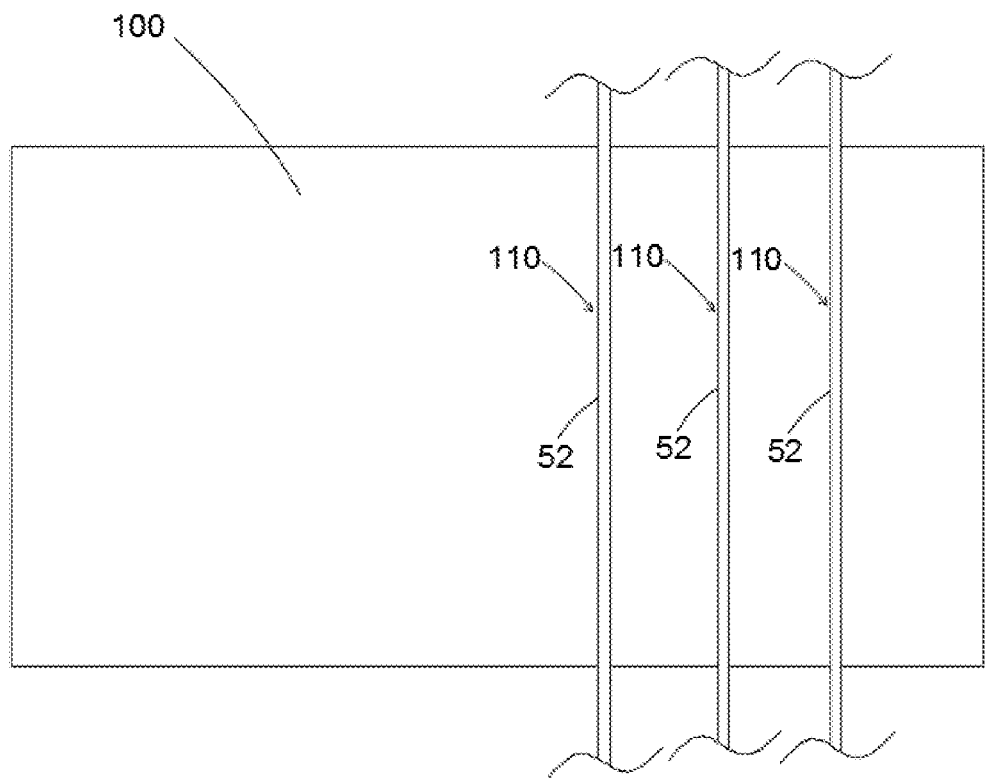
FIG. 7b is a schematic diagram of cutting a single to-be-machined object by using a plurality of discharge electrodes in the invention.
Figure 7C:
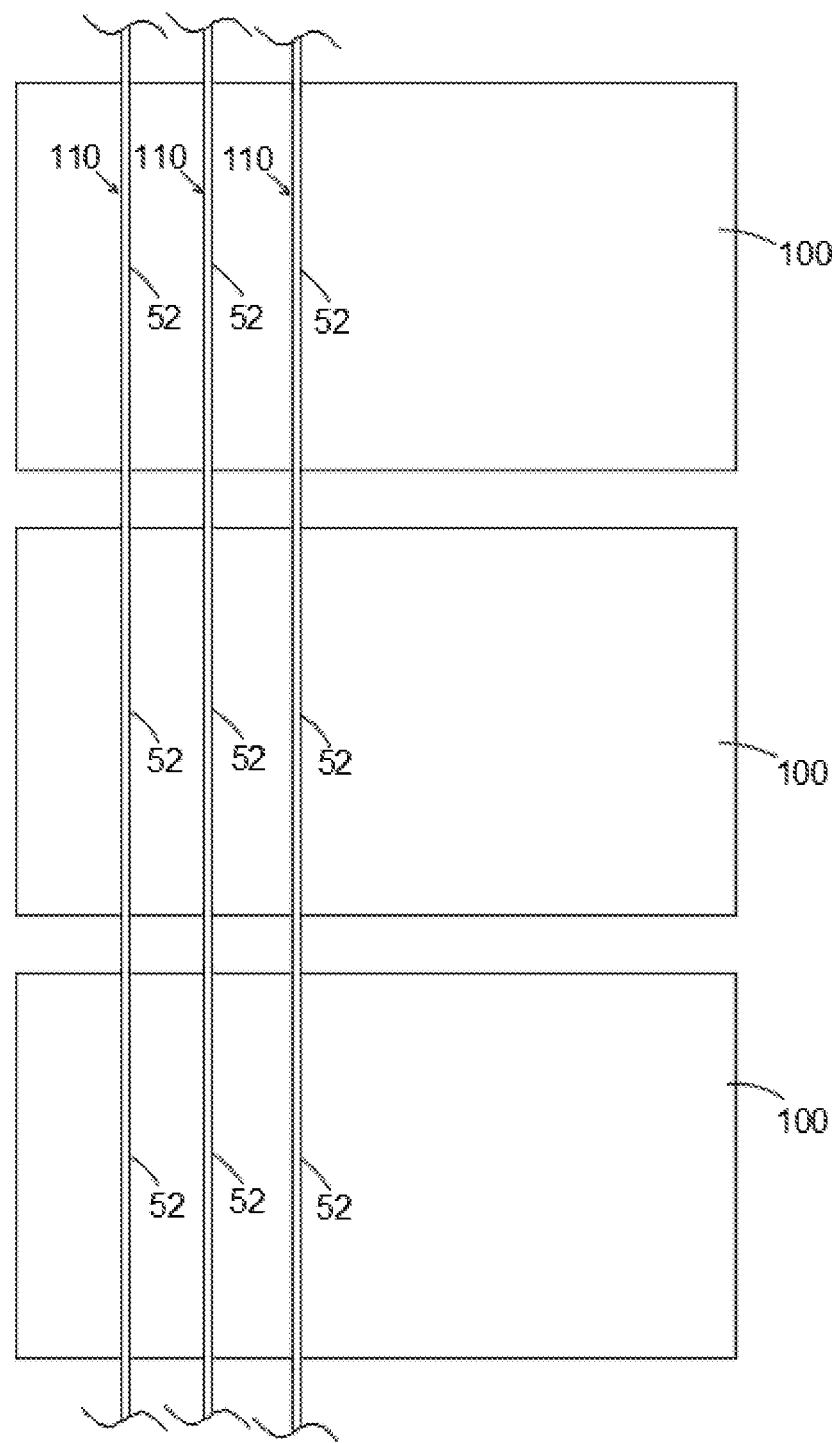
FIG. 7c is a schematic diagram of cutting a plurality of to-be-machined objects by using a plurality of discharge electrodes in the invention, wherein a viewing angle of FIG. 7a is different from that of FIG. 7b and FIG. 7c.

In addition, as shown in FIG. 3 and FIG. 4b, there is a gap between a surface of the discharge electrode 52 and a surface (a cut surface 100a) of the to-be-machined object 100 in a traveling direction and surfaces (cut surfaces 100b, 100c) of the to-be-machined object 100 in a non-traveling direction, wherein the gap is filled with insulating materials such as air, deionized water or oil, or other suitable insulating substances, as dielectric materials. For example, if the electrical discharge machining procedure is performed in deionized water, the deionized water will be filled into the gap described above. Likewise, if the electrical discharge machining procedure is performed in an atmospheric environment, air will be filled into the above-mentioned gap. In addition, as shown in FIG. 3, in a second embodiment of the invention, if the electrical discharge machining procedure is performed in a liquid tank 59a, a liquid 59b will be filled into the above-mentioned gap, and the liquid 59b in the liquid tank 59a is, for example, a heatable liquid such as oil, further capable of reducing thermal shock or increasing thermal uniformity. In addition, in a process of the electrical discharge machining procedure, the invention is capable of reducing jitter of the to-be-machined object 100 by liquid pressure, and reducing surface roughness of the cut surfaces 100b, 100c, which are conducive to improving a quality of electrical discharge machining. As described above, although the invention is illustrated by cutting one to-be-machined object 100 (i.e., a single solid structure) with one discharge electrode 52 (a single conductive structure), as shown in FIG. 4a, the invention is not limited thereto. The discharge electrode 52 of the invention is also capable of performing the electrical discharge machining procedure on the to-be-machined objects 100 (i.e., a plurality of solid structures) at the same time, for example, as shown in FIG. 7a, that is, the discharge electrode 52 is capable of cutting the to-be-machined objects 100 at the same time. Likewise, in the invention, the separated discharge electrodes 52 (a plurality of conductive structures) are capable of simultaneously performing the cutting procedure on the to-be-machined object 100 (as shown in FIG. 7b) or the to-be-machined objects 100 (as shown in FIG. 7c). Moreover, the electrical discharge machining procedure of the invention is not limited to be performed in the above-mentioned fluids such as liquid or gas, the electrical discharge machining procedure of the invention can also be performed in a vacuum environment. In other words, the electrical discharge machining procedure of the invention is capable of not only wet-cutting the to-be-machined object 100 by the discharge electrode 52 (that is, performing in the liquid tank 59a), but also capable of dry-cutting the to-be-machined object 100 with the discharge electrode 52 (i.e., performing in air or in a vacuum environment). Wherein, in the invention, in a process of dry-cutting the to-be-machined object 100 by the discharge electrode 52, the discharge electrode 52 can also be optionally cooled, for example, a cooling fluid such as liquid or gas is used to cool down or maintain a temperature of the discharge electrode 52, alternatively, the discharge electrode 52 can also be heated by the discharge energy, that is, without using a cooling fluid such as liquid or gas.

In addition, the invention is capable of further optionally performing a filling step, for example, using an external disturbance source, such as an ultrasonic unit 95 being used for providing an ultrasonic wave to cause a filling material to fill the surface cracks on the cut surfaces 100b, 100c of the machining target area 110 to prevent the unwanted surface cracks from expanding continuously, which can not only strengthen its structure, but can also achieve an efficacy of swiftly (even speeding up) performing the cutting step S20, S40, or S60. A composition of the filling material 114 can be, for example, Si, SiC, SiGe, Ge, GaAs, GaN, or InP, but is not limited thereto, any material suitable for filling cracks, such as filler or glue, can be applied in the invention. A frequency range of the ultrasonic wave is, for example, but not limited to, about 15 KHz to about 30 KHz. The filling step is preferably performed in a fluid, for example, the fluid is the liquid 59b such as oil or water, or a conductive medium such as air, and the ultrasonic wave can generate fluid droplets and shock pressure waves in the fluid, causing material particles of the filling material to be embedded in the surface cracks on cut or thinned surfaces of the machining target area 110. In addition, the invention is not limited to an ultrasonic unit 95 with a specific structure, and a direction in which the ultrasonic unit 95 provides ultrasonic waves is not particularly limited, as long as an effect of filling can be achieved, any ultrasonic unit and any direction are applicable to the invention. In the cutting procedure of the invention, a heat source 70 can be used to heat the to-be-machined object 100. The heat source 70 can be, for example, the liquid tank 59a, the microwave or radio-frequency source 60, or a laser source and/or an infrared light source. In addition, in the invention, a surface of the separated or cut solid structure (for example, a first half structure 100a) or a surface of a modified layer 120 thereof can be oxidized or chemically reacted by a heat energy provided by the heat source 70 to form the filling material such as silicon oxide or oxide in order to fill the surface cracks and prevent the surface cracks from transferring and expanding.

In summary, the electrical discharge machining apparatus and the electrical discharge machining method with adjustable machining parameters of the invention have the following advantages:

(1) The segmented cutting technology is capable of solving the problem of long total cutting time caused by large cutting thickness of electrical discharge machining.

(2) With the segmented cutting technology, when the to-be-cut parameters change to the set numerical value, the feeding direction can be changed immediately.

(3) With the segmented cutting technology, when the to-be-cut thickness is greater than the set numerical value, the feeding direction is changed immediately to be capable of dividing the to-be-cut surface with a large thickness into several cut surfaces with a smaller thickness, thereby solving the problem of slow cutting speed caused by large cutting thickness of electrical discharge machining.

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. An electrical discharge machining apparatus with adjustable machining parameters for performing a cutting procedure, comprising:
   a carrier for placing at least one to-be-machined object, the to-be-machined object being defined with a machining target area; and
   an electrical discharge machining (EDM) unit for cutting the machining target area of the to-be-machined object along a first cutting direction by at least one discharge electrode of the electrical discharge machining (EDM) unit with at least one machining parameter in a first cutting step of the cutting procedure, wherein the machining parameter is correspondingly adjusted when a specified parameter of the to-be-machined object changes to a first numerical value, thereby using the adjusted machining parameter to perform a second cutting step on the machining target area of the to-be-machined object,
   wherein the specified parameter comprises a first to-be-cut thickness of the to-be-machined object, the machining parameter is correspondingly adjusted when the first to-be-cut thickness of the to-be-machined object increases to the first numerical value, thereby using the adjusted machining parameter to perform the second cutting step on the machining target area of the to-be-machined object, wherein the machining parameter is an orientation parameter, when the first to-be-cut thickness of the to-be-machined object increases to the first numerical value, the electrical discharge machining (EDM) unit changes the orientation parameter from the first cutting direction to a second cutting direction, thereby performing the second cutting step on the machining target area of the to-be-machined object along the second cutting direction.

2. The electrical discharge machining apparatus with the adjustable machining parameters as claimed in claim 1, wherein the machining parameter further comprises one or more than one of a discharge electrical parameter, a deslagging parameter, and a movement and tension parameter.

3. The electrical discharge machining apparatus with the adjustable machining parameters as claimed in claim 2, wherein the orientation parameter is a machining direction relative to the to-be-machined object; the discharge electrical parameter comprises one or more than one of a peak current, a voltage when the to-be-machined object is away from the discharge electrode, a duration of discharge pulse, a rest time of discharge pulse, and a servo reference voltage between the discharge electrode and the to-be-machined object; the deslagging parameter comprises a flow rate of a deslagging liquid provided on the discharge electrode; the movement and tension parameter comprises one or more than one of a movement speed of the discharge electrode and a tension of the discharge electrode.

4. The electrical discharge machining apparatus with the adjustable machining parameters as claimed in claim 1, wherein a first included angle is between the second cutting direction and the first cutting direction, and the first included angle ranges from 0 degree to 360 degrees.

5. The electrical discharge machining apparatus with the adjustable machining parameters as claimed in claim 4, wherein the first included angle is 180 degrees.

6. The electrical discharge machining apparatus with the adjustable machining parameters as claimed in claim 1, wherein a second to-be-cut thickness of the to-be-machined object in the second cutting step is smaller than the first numerical value.

7. The electrical discharge machining apparatus with the adjustable machining parameters as claimed in claim 1, wherein a cutting speed of the discharge electrode on the to-be-machined object in the second cutting step is greater than a cutting speed of the discharge electrode on the to-be-machined object when the first to-be-cut thickness is the first numerical value.

8. The electrical discharge machining apparatus with the adjustable machining parameters as claimed in claim 1, wherein when a second to-be-cut thickness of the to-be-machined object increases to a second numerical value in the second cutting step, the electrical discharge machining (EDM) unit changes the orientation parameter from the second cutting direction to a third cutting direction, thereby performing a third cutting step on the machining target area of the to-be-machined object along the third cutting direction, wherein the to-be-machined object has a third to-be-cut thickness in the third cutting step.

9. The electrical discharge machining apparatus with the adjustable machining parameters as claimed in claim 8, wherein a second included angle is between the third cutting direction and the second cutting direction, and the second included angle is between 0 degree and 360 degrees.

10. The electrical discharge machining apparatus with the adjustable machining parameters as claimed in claim 9, wherein the second included angle is 90 degrees.

11. The electrical discharge machining apparatus with the adjustable machining parameters as claimed in claim 8, wherein the third to-be-cut thickness of the to-be-machined object in the third cutting step is smaller than the first numerical value or the second numerical value.

12. The electrical discharge machining apparatus with the adjustable machining parameters as claimed in claim 8, wherein a cutting speed of the discharge electrode on the to-be-machined object in the third cutting step is greater than a cutting speed of the discharge electrode on the to-be-machined object when the first to-be-cut thickness is the first numerical value or a cutting speed of the discharge electrode on the to-be-machined object when the second to-be-cut thickness is the second numerical value.

13. The electrical discharge machining apparatus with the adjustable machining parameters as claimed in claim 1, further comprising a heat source, and the heat source heating the to-be-machined object during the cutting procedure.

14. The electrical discharge machining apparatus with the adjustable machining parameters as claimed in claim 1, wherein the discharge electrode cuts the machining target area of the to-be-machined object in a fluid.

15. The electrical discharge machining apparatus with the adjustable machining parameters as claimed in claim 1, wherein the machining target area is provided with a filling material thereon for filling surface cracks formed on the machining target area during the cutting procedure.

16. The electrical discharge machining apparatus with the adjustable machining parameters as claimed in claim 15, wherein the filling material is formed on the machining target area by a heat source for filling surface cracks formed on the machining target area during the cutting procedure.

17. The electrical discharge machining apparatus with the adjustable machining parameters as claimed in claim 1, further comprising an external disturbance source, the external disturbance source causing a filling material to fill surface cracks on the machining target area during the cutting procedure.

18. The electrical discharge machining apparatus with the adjustable machining parameters as claimed in claim 1, wherein a quantity of the to-be-machined object is one or more than one.

19. The electrical discharge machining apparatus with the adjustable machining parameters as claimed in claim 1, wherein a quantity of the discharge electrode is one or more than one.

20. The electrical discharge machining apparatus with the adjustable machining parameters as claimed in claim 1, wherein the discharge electrode cuts the machining target area of the to-be-machined object in a vacuum environment.

21. An electrical discharge machining method with adjustable machining parameters, using the electrical discharge machining apparatus with the adjustable machining parameters as claimed in claim 1 to perform a cutting procedure.

22. An electrical discharge machining method with adjustable machining parameters for performing a cutting procedure, comprising following steps of:
   providing at least one to-be-machined object, the to-be-machined object being placed on a carrier, the to-be-machined object being defined with a machining target area;
   performing a first cutting step by applying a discharge energy to the machining target area of the to-be-machined object along a first cutting direction through at least one discharge electrode with at least one machining parameter for cutting the machining target area of the to-be-machined object;
   performing a first adjustment step by correspondingly adjusting the machining parameter when a first to-be-cut thickness of the to-be-machined object increasing to a first numerical value; and
   performing a second cutting step by applying the discharge energy to the machining target area of the to-be-machined object through the discharge electrode with the machining parameter adjusted by the first adjustment step for cutting the machining target area of the to-be-machined object,
   wherein the machining parameter is an orientation parameter, and in the first cutting step, when the first to-be-cut thickness of the to-be-machined object increasing to the first numerical value, performing the first adjustment step for changing the orientation parameter from the first cutting direction to a second cutting direction, and performing the second cutting step on the machining target area of the to-be-machined object along the second cutting direction.

23. The electrical discharge machining method with the adjustable machining parameters as claimed in claim 22, wherein a second to-be-cut thickness of the to-be-machined object in the second cutting step is smaller than the first numerical value.

24. The electrical discharge machining method with the adjustable machining parameters as claimed in claim 22, wherein in the second cutting step, when a second to-be-cut thickness of the to-be-machined object cut by the discharge electrode increasing to a second numerical value, performing a second adjustment step for changing the orientation parameter from the second cutting direction to a third cutting direction, and performing a third cutting step on the machining target area of the to-be-machined object along the third cutting direction.

25. The electrical discharge machining method with the adjustable machining parameters as claimed in claim 24, wherein a third to-be-cut thickness of the to-be-machined object in the third cutting step is smaller than the first numerical value or the second numerical value.

26. The electrical discharge machining method with the adjustable machining parameters as claimed in claim 22, wherein in the first adjustment step, changing a placement direction of the to-be-machined object for adjusting the machining parameter.

27. The electrical discharge machining method with the adjustable machining parameters as claimed in claim 22, wherein in the first adjustment step, changing a feeding direction of the discharge electrode relative to the to-be-machined object for adjusting the machining parameter.

28. The electrical discharge machining method with the adjustable machining parameters as claimed in claim 22, wherein in the first adjustment step, using the carrier to change a placement direction of the to-be-machined object for adjusting the machining parameter.

29. The electrical discharge machining method with the adjustable machining parameters as claimed in claim 22, further comprising a filling step for filling surface cracks formed on the machining target area during the cutting procedure.

\* \* \* \* \*